United States Patent
Gritti et al.

(10) Patent No.: US 9,596,410 B2
(45) Date of Patent: Mar. 14, 2017

(54) VISION SYSTEMS AND METHODS FOR ANALYSING IMAGES TAKEN BY IMAGE SENSORS

(71) Applicant: PHILIPS LIGHTING HOLDING B.V., Eindhoven (NL)

(72) Inventors: Tommaso Gritti, Breda (NL); Gianluca Monaci, Eindhoven (NL); Harry Broers, 'S-Hertogenbosch (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 225 days.

(21) Appl. No.: 14/380,404

(22) PCT Filed: Feb. 15, 2013

(86) PCT No.: PCT/IB2013/051251
§ 371 (c)(1),
(2) Date: Aug. 22, 2014

(87) PCT Pub. No.: WO2013/124772
PCT Pub. Date: Aug. 29, 2013

(65) Prior Publication Data
US 2015/0312481 A1  Oct. 29, 2015

Related U.S. Application Data

(60) Provisional application No. 61/601,684, filed on Feb. 22, 2012.

(51) Int. Cl.
*H04N 5/243* (2006.01)
*H04N 5/232* (2006.01)
(Continued)

(52) U.S. Cl.
CPC ..... *H04N 5/23264* (2013.01); *H04N 5/23238* (2013.01); *H04N 5/243* (2013.01); *H04N 5/3572* (2013.01); *H04N 5/91* (2013.01)

(58) Field of Classification Search
None
See application file for complete search history.

(56) References Cited

U.S. PATENT DOCUMENTS

| | | | |
|---|---|---|---|
| 5,384,900 A * | 1/1995 | Sato | G06T 1/60 345/530 |
| 2006/0007327 A1* | 1/2006 | Nakamura | H04N 5/2621 348/239 |

(Continued)

FOREIGN PATENT DOCUMENTS

| | | |
|---|---|---|
| JP | 2007159037 A | 6/2005 |
| JP | 2010239267 A | 10/2010 |
| WO | 2006019209 A1 | 2/2006 |

OTHER PUBLICATIONS

English Translation JP 2010 239267—Takamura.*

(Continued)

*Primary Examiner* — Geepy Pe
*Assistant Examiner* — Janese Duley

(57) ABSTRACT

A vision system is disclosed having an image sensor for capturing an image, the image sensor having a lens, an image processing unit and optionally a memory unit. The image processing unit is adapted to capture and/or store in the memory, for selected areas of the image, a set of frames from the past, where the division of the image in areas and/or the number of frames from the past depend on lens parameters, position and/or orientation of the image sensor, or image parameters of the captured image.

13 Claims, 8 Drawing Sheets

(51) Int. Cl.
*H04N 5/357* (2011.01)
*H04N 5/91* (2006.01)

(56) References Cited

U.S. PATENT DOCUMENTS

2007/0200937 A1   8/2007  Yoda
2010/0002071 A1   1/2010  Ahiska
2011/0134245 A1   6/2011  Khizhnichenko

OTHER PUBLICATIONS

E. Schwalbe, "Geometric Modelling and Calibration of Fisheye Lens Camera Systems", Institute of Photogrammetry and Remote Sensing, Dresden University of Technology, Dresden, Germany, undated, 6 pages.

\* cited by examiner

VISION SYSTEMS AND METHODS FOR ANALYSING IMAGES TAKEN BY IMAGE SENSORS

CROSS-REFERENCE TO PRIOR APPLICATIONS

This application is the U.S. National Phase application under 35 U.S.C. §371 of International Application No. PCT/IB2013/051251, filed on Feb. 15, 2013, which claims the benefit of U.S. Provisional Patent Application No. 61/601,684, filed on Feb. 22, 2012. These applications are hereby incorporated by reference herein.

FIELD OF THE INVENTION

The invention relates to a vision system comprising an image sensor and a means for analysing an image taken by the image sensor.

BACKGROUND OF THE INVENTION

Image sensors providing an image for a field of view are broadly used in vision applications such as surveillance, environment monitoring, robotic navigation and also Philips LumiMotion streetlamps wherein a streetlamp is turned on when presence of a person is detected.

These image sensors preferably provide a broad field of view while also being compact and inexpensive. Disadvantages of using a broad field of view are image distortion and loss of illuminance towards the periphery. These disadvantages always are present but are in particular noticeable when wide-angle and fisheye lenses are used.

While solutions are available for reducing these deficiencies, most of these solutions add significantly to the costs, e.g. in the image sensor by having to increase pixel resolution at the periphery by means of customized lenses, and/or in the means for analysing the image by having to use advanced video processing which demands calculating power with increased demand for memory storage etc.

SUMMARY OF THE INVENTION

To at least partly overcome these disadvantages and provide a solution that does not or to a lesser degree require expensive hardware and/or reduces the amount of memory to be allocated and/or does not require complicated video processing for methods based on software adaptation the vision system of the invention comprises:

at least one of a sensor setting ascertaining means for establishing an image sensor parameter and an image analysis means for analysing an image taken by the image sensor and establishing an image parameter;

an image dividing means for dividing the image into areas as a function of the established image sensor parameter and/or the established image parameter, and for assigning to each area a number of frames to be stored in a memory.

The image, or at least part of the image, is thus divided into areas, wherein the number of frames stored in memory differs for different areas, some areas using a smaller number of frames and some using larger number of frames.

By dividing the field of view into a number of areas, such division being dependent on image capturing parameters (such as lens parameters or image sensor position and/or orientation parameters) and/or parameters of the images being captured (such as brightness distribution and/or motion detection within parts of the image) and assigning a number of frames to be stored in memory to the above mentioned areas, the demand for frame memory and/or the demand for computing power can be reduced while yet offering a good image.

In the broadest sense of the invention the memory may be separate from the vision system as such. In such embodiments the vision system reduces the memory size required for a memory, wherein a memory can be any data storage device, whether hardware or software. The same holds for the method according to the invention, which in embodiments is a method for providing data to be stored.

In some embodiments the memory is comprised in the vision system and the system has a means to store image data in the memory in accordance with a division in areas and assignment of number of frames to be stored for each area.

In some embodiments the means for dividing the image comprise means to capture and/or store and/or calculate information on:

a lens parameter of the image sensor and/or
a position and/or orientation of the image sensor and/or
a brightness value in the image and/or,
a motion detection in the image and/or,
a motion detected in past image frames.

In a preferred embodiment, the image sensor comprises a wide-angle lens and the number of frames stored per area depends on a lens parameter of the wide-angle lens. For example, in a preferred embodiment, the image is divided into areas dependent on the distance from the centre of the image and more frames are stored for areas closer to the periphery of the image. Summing of a larger number of past frames, for areas at a larger distance from the centre, allows for computing an (adaptive) cumulated exposure. This embodiment solves the brightness problem i.e. loss of illuminance at the periphery, reduces the amount of noise and does not introduce substantial motion blur by cumulating or adding multiple frames because movements at the periphery of the field of view are anyhow imaged onto less pixels compared to similar movements in the centre of the field of view.

In an embodiment the information used to divide the image into image areas provides information on a lens parameter of the image sensor and also the position and/or orientation of the image sensor with respect to the field of view. Cameras are often positioned on a ceiling near a wall or in a corner and the field of view is away from the ceiling towards the ground. This set-up provides a specific image distortion, wherein one edge of the image shows objects nearby, while the other edge is far away. It is then advantageous to divide the image into bands wherein for a band showing nearby objects a smaller number of past frames is summed then for a band in the image showing far away objects.

In an embodiment the information provides information on a brightness value in areas of an image. For bright image areas a smaller number of past frames may be summed than for dark image areas. This also reduces the amount of memory needed.

The invention can be applied to various vision systems including vision systems incorporated into or cooperating with professional and consumer luminaires and lighting systems, as well as for instance vision systems for robotic appliances such as robot vacuum cleaners.

The information used for dividing the image into areas, i.e. for dividing the field of view of the camera into areas, may be static information such as for instance one or more lens parameters which are fixed parameters given by the properties of the lens. In such a case the vision system may apply this static information relating to the sensor or the sensor may even have it incorporated as a fixed setting. In other embodiments the information may be dynamic. Examples of dynamic information may be related to the position and orientation of the image sensor, the distribution of light in the image i.e. dark areas versus light areas, motion related parameters such as present or past motion detections in certain areas, etc. The division of the image in areas may be performed directly at image capturing which is advantageous especially when static information on e.g. one or more lens parameters is used, or may be performed after analysis of image data and before storing of the data in the memory. The memory may provide (past) information to aid in the analysis. Likewise, if and when the data stored in the memory is used in a post-processing, the post-processor may, in embodiments, provide, via a feedback loop, information on the result of the post-processing to the means for dividing the image and/or to the means for assignment the number of frames to be stored for an area. Feedback from image post-processing may improve fine tuning of the process.

BRIEF DESCRIPTION OF THE DRAWINGS

These and other objects and advantageous aspects will become apparent from exemplary embodiments that will be described using the following Figs.

The figures are not drawn to scale. Generally, identical components are denoted by the same reference numerals in the figures.

DETAILED DESCRIPTION OF PREFERRED EMBODIMENTS

Figure 1:
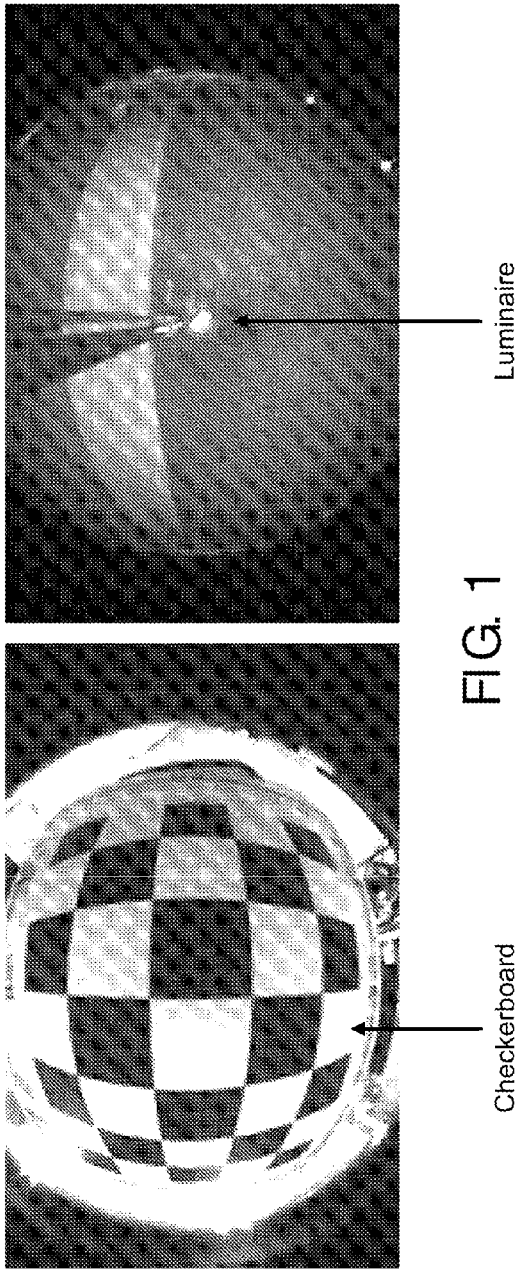
FIG. 1 illustrates image distortion resulting from a fisheye lens.

A first example of some of the problems associated with vision systems is illustrated in FIG. 1.

Wide-angle and fisheye lenses are broadly used in vision applications such as surveillance, environment monitoring, robotic navigation etc., because they provide a broad field of view, while being compact and inexpensive. For example, the Philips LumiMotion smart streetlamp includes a fisheye camera used to detect the presence of a person close to the luminaire and based on that turn on the streetlamp, which is normally dimmed. A picture of a regular checkerboard captured with a fisheye camera of the LumiMotion system is shown in FIG. 1 (left). Images taken with fisheye imaging systems have the characteristic distorted appearance that can be seen in the picture: the image magnification decreases with increasing distance from the optical axis, and the image appears as if it has been mapped on a hemisphere. The distortion introduced by these lenses does not preserve the rectilinearity of an object in its transformation from real-world coordinates to the image plane: straight lines in the real world look as circular sections in the distorted image plane. Another well known distortion introduced by fisheye lenses is the loss of brightness towards the periphery of the image because of the structure of the camera system. This distortion is particularly deleterious for the LumiMotion system, where the fisheye camera is working during the night exploiting only the little light emitted by the dimmed luminaire installed next to it. Images captured with the system are extremely dark at the periphery, as can be seen in FIG. 1 (right).

If images taken with a fisheye camera have to be displayed and/or processed to extract information about the content of the captured scene, the estimated size and velocity of objects in the scene, etc., it is important to take into account the distortions introduced by the wide-angle lens. This problem is well known in computer graphics and computer vision, and a series of techniques have been developed to rectify fisheye images. The typical way of dealing with images distorted by wide-angle lenses is to calibrate the fisheye camera system, rectify the output images and process these rectified images using standard video processing techniques. In a very similar way, video processing techniques can be applied directly to the distorted images, and the result of the processing can then be rectified using the camera calibration data.

While simple to implement, known computer vision techniques are effective only for lenses with limited viewing angle or for the central region of fisheye camera systems. There are two main reasons for that:

1. Fisheye cameras introduce an extreme distortion at the image borders. The resolution in the peripheral regions of the image is extremely low and therefore the information in these parts of the image cannot be "created", it is simply not there.

2. The amount of light reaching the sensor from the peripheral regions is very low.

As underlined before, this problem is particularly noticeable in systems operating at night and systems where the main light source is next to the camera, like the LumiMotion system, but it is also present in other vision systems, though usually to a lesser degree. Few solutions can help alleviate or solve these problems.

A sensor and lens system custom designed to have higher resolution at the periphery than at the centre is in theory possible to implement. However such a solution would be extremely expensive and would only alleviate the distortion problem. Another way to increase the luminosity at the periphery of the image is to increase the exposure time of the imaging device. However, this would over-expose the central part of the image. To solve this problem, a compensating plate or apodizer that blocks part of the light reaching the centre of the sensor can be placed in front of the lens. In this way however, the overall light reaching the sensor will decrease, requiring very long exposure times, especially at low light levels as in the LumiMotion setting. This solution has two major drawbacks:

fast-moving objects in the centre of the image exhibit severe motion blur.

a system using the processed frames is operating at a slow speed, as the operating speed is bound by the rate at which the frames are refreshed.

A number of other options are possible. One option is to adaptively expose different parts of the image by changing the exposure time of individual pixels depending on the amount of light they receive. In this way pixels in the centre of the fisheye camera would be exposed for a short time, avoiding motion blur, while pixels at the periphery would be exposed for longer time, avoiding underexposure. There are several ways of implementing such exposure control. The image can be blocked on the detector side, as done in dynamic filtering, or the method could be incorporated into CMOS chip designs by offsetting pixel sample and digitization times. While possible, these solutions are still extremely expensive and far from being commercially available.

Given the importance of keeping the bill of material low, a solution is sought that does not require expensive hardware, and preferably also reduces the amount of memory required for methods based on software adaptation.

To this end a system according to the present invention may comprise the following:

an image sensor with a lens for capturing an image;

a image processing unit with optionally a memory unit, the image processing unit adapted to, for selected areas of the image, store a set of frames from the past, where the division of the image in areas and/or the number of frames captured and/or stored for the selected areas depends on a lens parameter and/or position/orientation of the image sensor and/or a parameter of the image itself.

Figure 2:
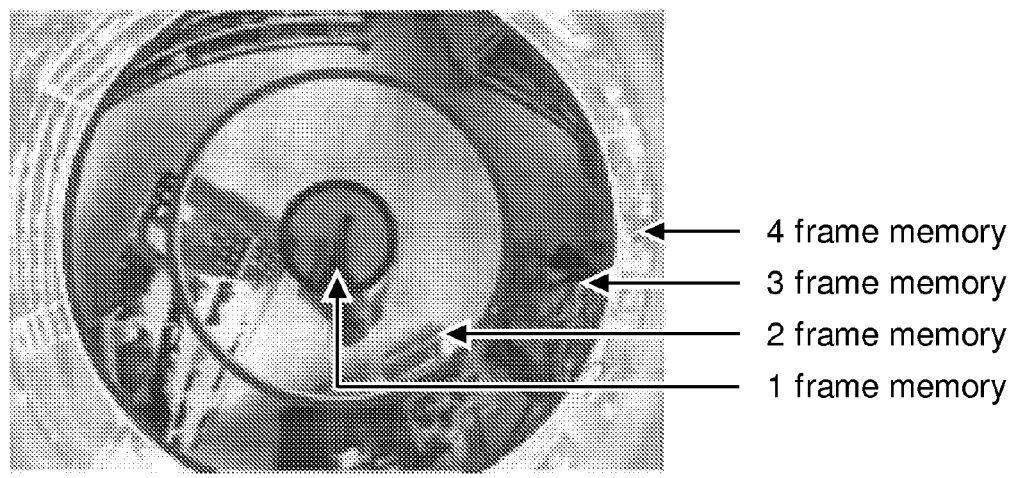
FIG. 2 illustrates a number of frames allocated to various parts of an image
Figure 3:
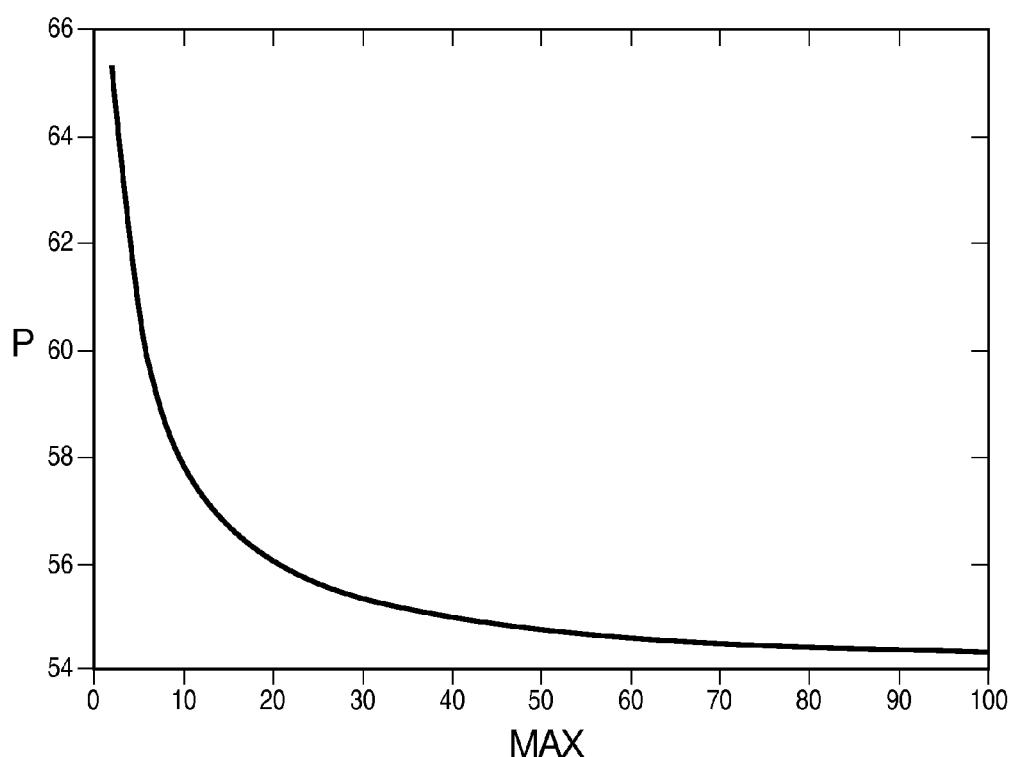
FIG. 3 illustrates the percentage of memory usage

For example, one embodiment of a methodology according to the invention could comprise capturing and/or storing proportionally more frames (i.e. more samples per pixel) in areas further away from the centre of the image (i.e. further away from the optical axis of the lens). The method is illustrated in FIG. 2, in which, for the indicated areas, a minimum of 1 frame for a central area up to a maximum of 4 frames for a peripheral area, is stored in memory. The memory requirements for a system according to this embodiment of the invention, compared to the memory requirements in case complete frames of the entire image would be stored, is illustrated in FIG. 3. In FIG. 3 the horizontal axis shows the maximum number of frames taken per image area, and the vertical axis shows the estimated percentage of memory required (compared to using full image frames). The figure shows a estimated reduction down to 65% in cases where the image is divided in two areas (central versus peripheral) and 2 frames are captures for the peripheral area whereas only 1 frame is captured for the central area. The memory requirements converge down to 55% for cases with a larger set of image areas and a larger set of frames per area. Less memory is thus needed, while the overall image quality increases.

Figure 9:
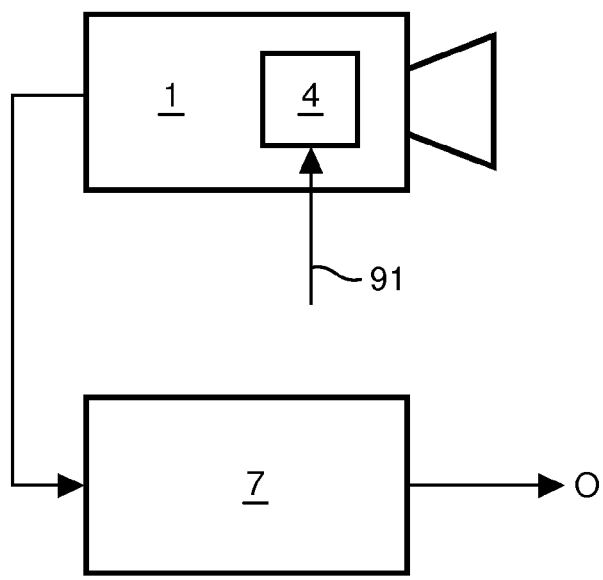
FIG. 9 illustrates another embodiment of a system according to the invention
Figure 10:
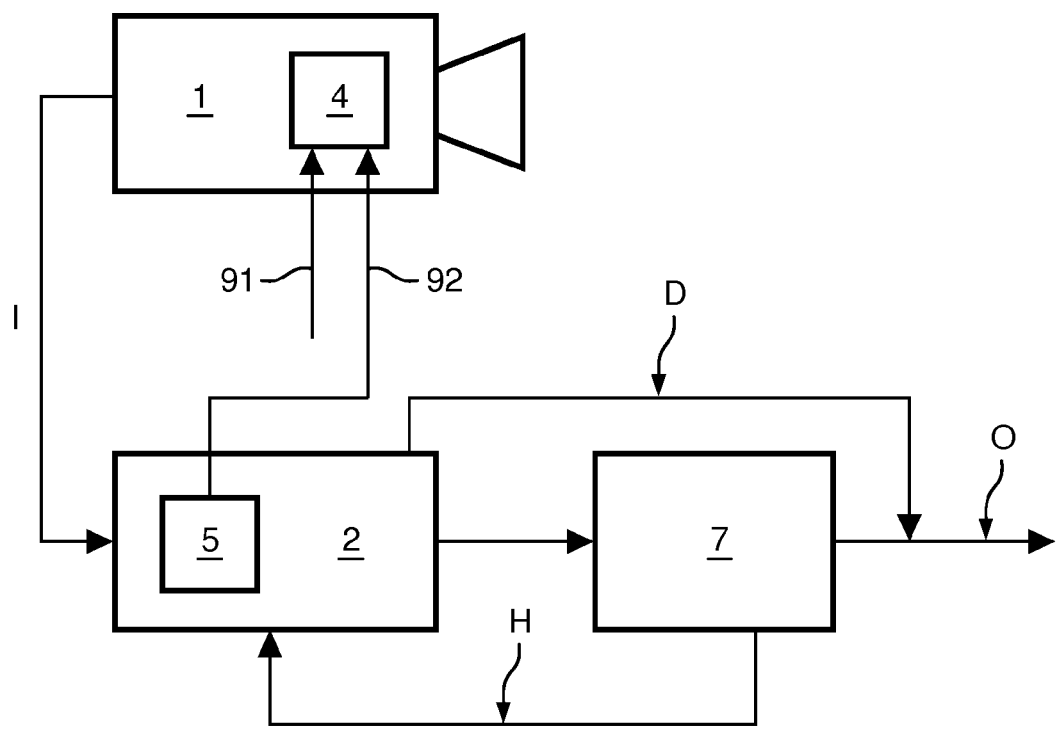
FIG. 10 illustrates a further embodiment of a system according to the invention.

The invention can be implemented in at least two ways:
I. Capture a full frame from the image sensor and store in memory only the image pixels from selected image areas. Which pixels to save and when may depend on the lens geometry, position of the lens and possibly other data such as illumination etc., as described further on with reference to FIGS. 5 to 8. This embodiment thus includes capturing all of the frames and manipulating the data after imaging and before storing.
II. Program the image sensor to capture only the required pixels for a given frame and save all captures data in memory. This embodiments is illustrated in FIGS. 9 and 10.

The easiest way of grouping pixels into image areas would be to use rectangular areas of interest (also referred to as Regions of Interest—ROI), although circular regions as shown in FIG. 2 can also be used.

ROIs of arbitrary shapes are somewhat more complicated to achieve but allow greater latitude to choose which pixels require multiple samples to be saved, depending on e.g. the lens geometry or pixel brightness.

Figure 4:
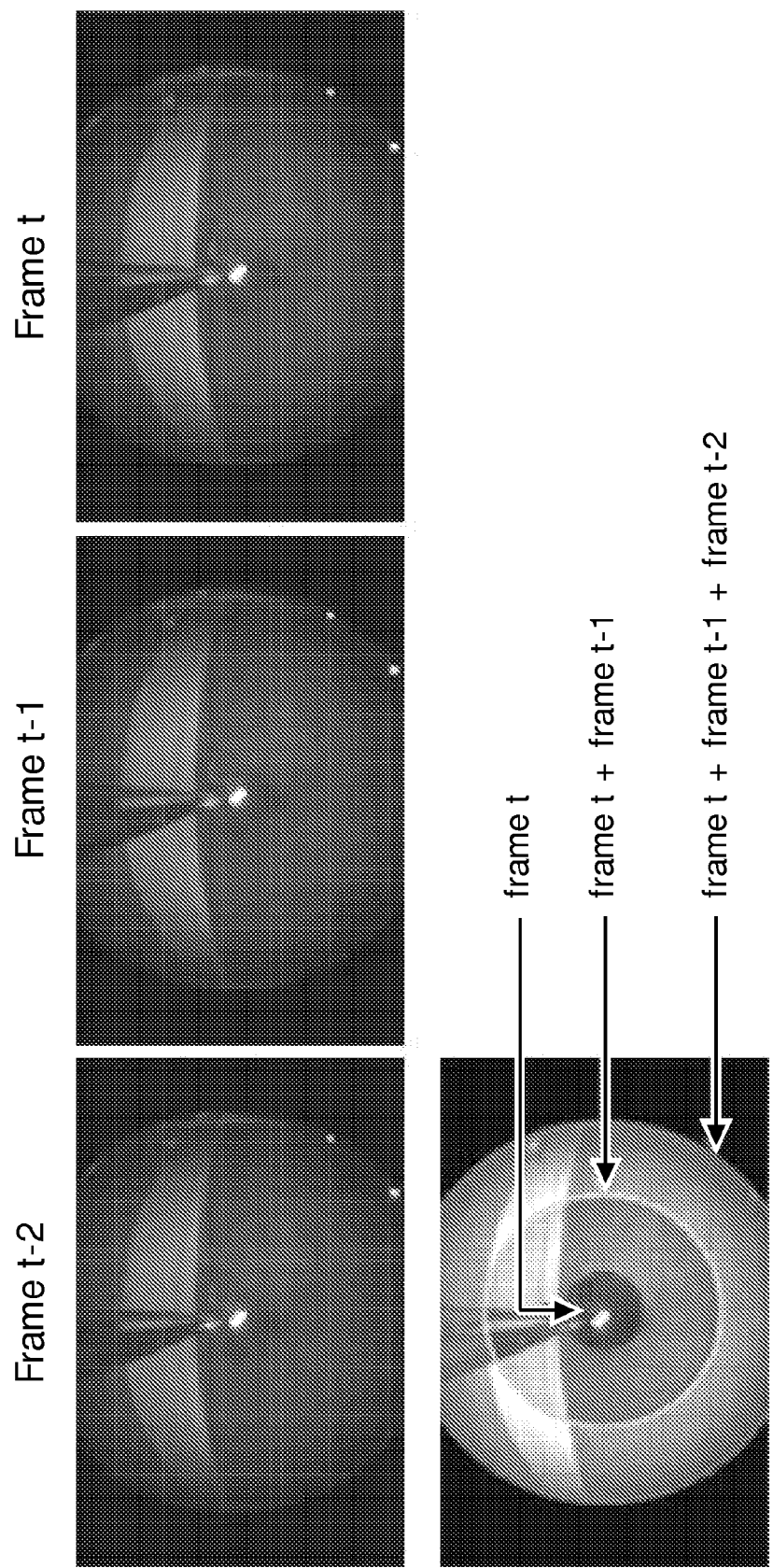
FIG. 4 further illustrates a division of an image and the result of cumulating frames

FIG. 4 shows the result of an algorithm exploiting the proposed methodology to compute a cumulated exposure, in which pixel values at a larger distance from the centre of the image are obtained by summing multiple frames from the past. For the central area only the image at time t (the current frame) is used and for the peripheral part for example three frames are summed. This approach allows obtaining an (adaptive) cumulated exposure, which is similar to what could be achieved with specialized hardware, as described above. An important property of the system and method of the invention, which applies for any type of lens but in particular when using a wide angle lens, is distortion of the apparent motion. An object moving at constant velocity across the field of view, will show an apparent velocity (derivable from captured images) greater in the central part of the image than in the peripheral region. Cumulating multiple frames in the peripheral image area would therefore increase the apparent velocity in these areas (more comparable to the apparent velocity in the central image area) without introducing strong motion blur and while at the same time reducing the amount of noise in the peripheral image area.

Figure 5:
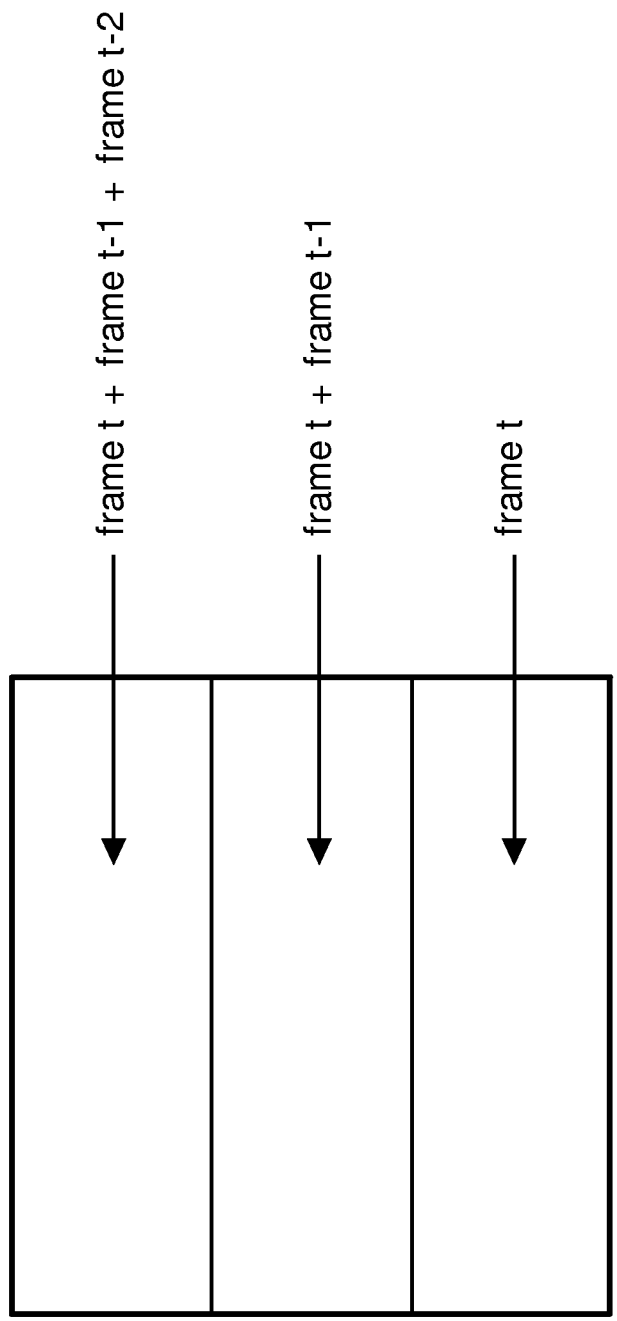
FIG. 5 illustrates another embodiment of dividing an image

The images in FIG. 4 are taken with a camera looking down from the ceiling wherein the centre of the image is the view straight down from the ceiling. Cameras for guarding a space are also often positioned on a ceiling part near a wall, at an angle to the ceiling and the wall. The camera looks into the space to be guarded, the field of view being away from the ceiling towards the ground. This particular position and orientation of the image sensor results a specific image distortion, wherein one edge of the image shows objects nearby, while the other edge is far away. In such cases it may be advantageous to divide the image into parallel bands wherein for an image band depicting nearby objects a smaller number of frames is summed compared to an image band depicting far away objects. Also this embodiment would reduce the motion distortions as explained in the previous paragraph in relation to FIG. 4. FIG. 5 illustrates schematically how the images would be summed for a set-up wherein the image is divided into three parallel bands, the lower band in FIG. 5 (imaging the environment nearby) using only one frame (the current frame) and the upper band in FIG. 5 (imaging the environment furthest away) using three frames (the current frame and two most recent frames). More than three image bands can be used and also the bands can have curved boundaries to map as closely as possible with the image distortion of the camera system. For example, the curved boundaries could map the outline of circles or ellipses with a centre point outside the image.

Figure 6:
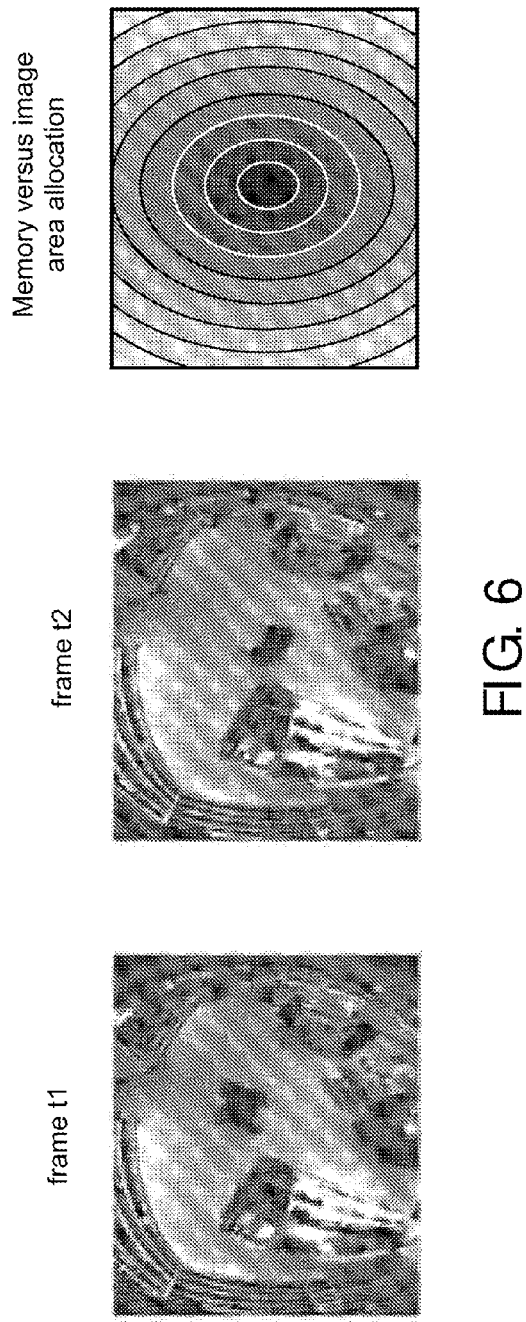
FIG. 6 illustrates summing up to 10 frames
Figure 7:
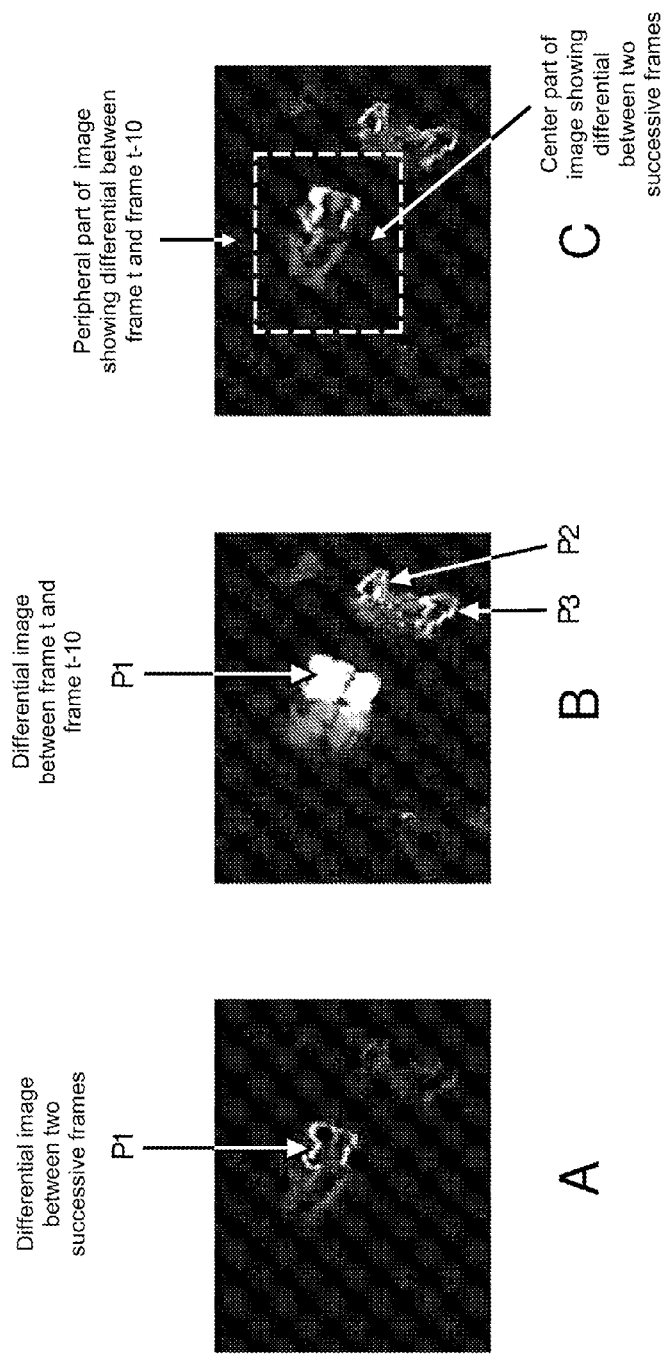
FIG. 7 illustrates results obtained with one embodiment of the invention.

Another example adopting the proposed methodology to compute (adaptive) motion detection is illustrated by means of FIGS. 6 and 7. The images are captured in an indoor environment where the amount of light is sufficient at any distance from the centre of the camera to yield sufficient brightness in all areas of the captured image. However, because of the distortions introduced by the lens, in this example a wide angle lens, the apparent motion captured at the periphery of the field of view is very subtle, as previously discussed. In the example of FIG. 6 the available memory and set-up of image areas allows for storing up to 10 frames for the peripheral image area, so that the detection of moving subjects is much improved. The rightmost part of FIG. 6 shows memory versus image area allocation. Here, 10 frames can be stored for pixels in the peripheral image area and 1 frame will be stored in the centre of the image. The various image areas are indicated by circular/eliptic grayscale regions. FIG. 7 illustrates how motion detection can be improved in this embodiment. The left most image A is a differential image of two successive frames captured by the image sensor, the difference being indicated with white pixels. A threshold value may be used to highlight motion and differentiate real motion from incidental small vibrations. As illustrated in image A, the difference between two successive frames is sufficient to detect a person P1 moving at the central area of the image, but not to detect moving persons P2, P3 at the periphery. Image B shows a differential image between frame t and frame t−10. From this differential image, a change in position of persons P2, P3 may be detected from pixel comparison such that, even in the peripheral area of the image, motion is detected. However, a large blob would be obtained for person P1 moving in the centre because of the considerable magnification and number of pixels involved in the displacement of person P1 in the central area. Such a blob makes it difficult, if not impossible, to distinguish movement of different people simultaneously in the central area. A possible solution, within the scope of the invention, is depicted in image C, wherein for the centre part of the image, schematically indicated by a rectangular area, a 1-frame difference is used, while for the peripheral part of the image as 10-frame difference is used. The solution provides optimal motion detection giving a sharp image of person P1 in the centre as well as a sharp image of persons P2 and P3 at the periphery, while, in this case, saving 41% of memory usage, compared to storing the total image area for all 10 frames in memory. FIG. 7 is a simple illustration of an embodiment of the invention. In more complex embodiments the image may be divided in more areas, for instance a central area in which a 1-frame difference is used, an area surrounding the central area in which a 5-frame difference is used, and a peripheral area in which a 10-frame difference is used. The areas may be rectangular as shown in FIG. 7, circular or elliptic as shown in FIG. 6 or adapted to the optical properties of the camera system.

It will be clear that within the invention many variations are possible. For instance, in the examples presented a firm boundary is drawn around areas within the image for which a specific number of frames are allocated in memory. Within the scope of the invention the areas may partially overlap such that the area for which a single frame is allocated partly overlaps an area for which two frames are allocated, which partly overlaps an area for which three frames are allocated etc. This provides the possibility of applying advances image processing techniques to smoothen the transition between two imaged areas to avoid the borderline between them from becoming too pronounced in the image.

Figure 8:
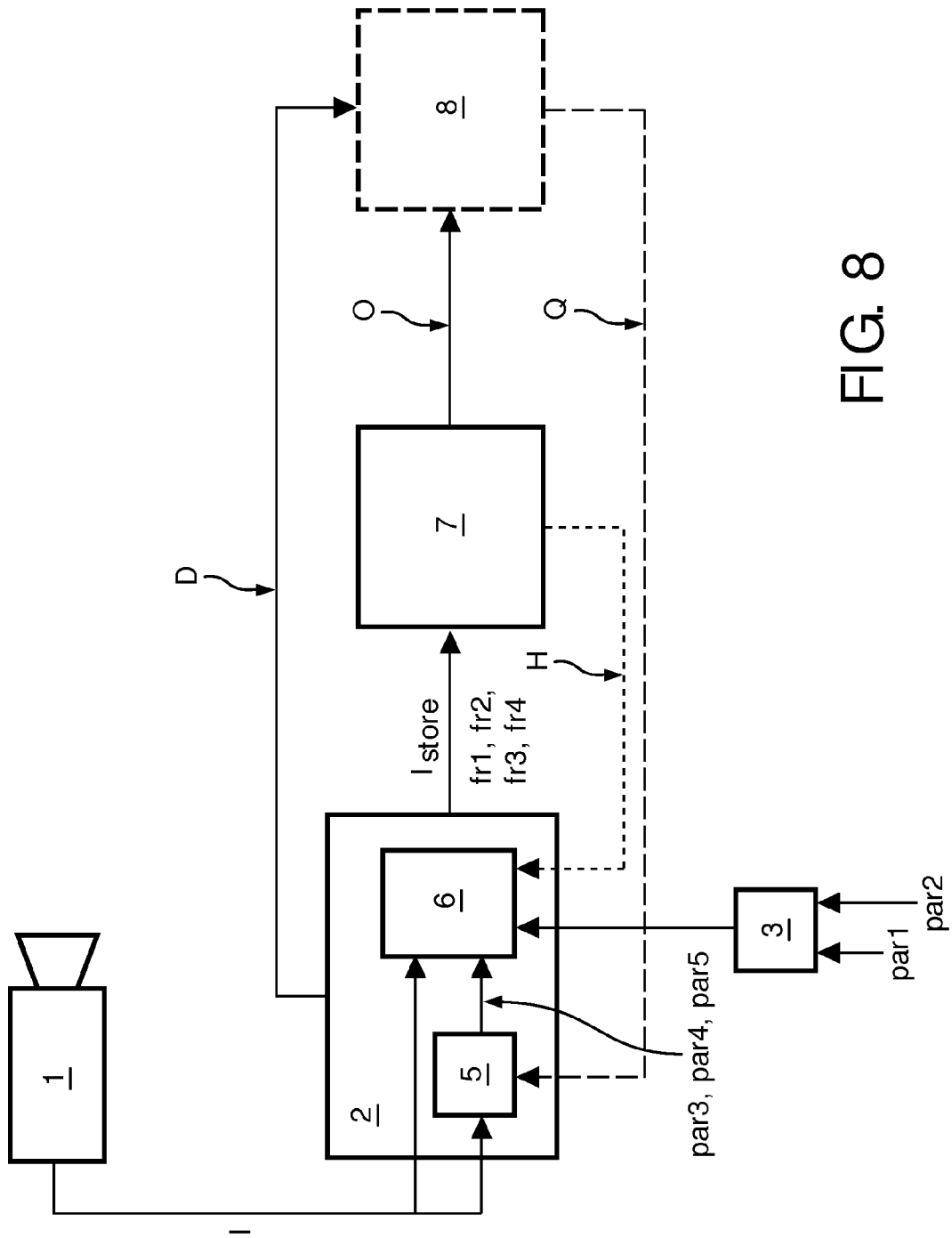
FIG. 8 illustrates an embodiment of a system according to the invention

FIG. 8 illustrates schematically an embodiment of a system according to the invention.

The system comprises an image sensor 1, a camera settings unit 3, an image processing unit 2 including an image analysing means 5 and an image dividing means 6, a memory 7 and a post-processing unit 8. The output of the image sensor 1, i.e. image I, is input to the image processing unit 2. A further input to the image processing unit 2 is provided by camera settings unit 3. Camera settings unit 3 may provide one or more of the following parameter settings to the image processing unit 2: (i) a parameter par1 related to the lens system and (ii) a parameter par2 related to the physical location and/or position of the image sensor e.g. with respect to the field of view. These parameters may be obtained from the image sensor 1, or alternatively, from another source such as a website or DVD or other information carrier or information supplying means providing camera specification data. Such parameters are independent from the image captured by the image sensor 1 but are determined by characteristics of the image sensor hard-/software and/or its position. Alternatively, the system may already have these parameters stored as presets or retrieved from a camera catalogue. For example when a limited number of image sensors is used in a vision system, the system may have stored the parameters of the lens configuration used with these image sensors and, once the vision systems receives input on the type of image sensor used, the system may fetch the relevant parameters from the stored catalogue information. Data on location and/or position of the image sensor may be determined on installation and input as parameter par2 in camera settings unit 3. The camera setting parameters typically are fixed settings, although they may have to be considered as variable data if the camera is provided with a means for moving the camera and change its position or orientation. As a further alternatively, the camera settings unit 3 may be omitted and the image processing unit 2 itself may analyse an image captures by the image sensor to deduce camera related settings and/or image distortion data. In all the above embodiments the visions system comprises means to ascertain one or more image sensor parameters.

Further within the scope of the invention there may be deduced image related information that the image processing unit 2 can itself detect or calculate in or from the images received from the image sensor 1. Such parameters may for instance include: (i) the number of movement (e.g. of human beings) detected in previous images in particular areas of the image (par3), (ii) the brightness profile or histogram of previous images (par4), and (iii) the size of motion detected in previous images (par5). In FIG. 8 the feature for deducing this image related information is schematically represented as image analysing means 5 of which the output, in the form of for example parameters par3, par4 and par5, is provided as input for the image dividing means 6. The image analysing means 5 may also get information from memory 7 on for instance image properties of stored frames (past frames). Schematically this is illustrated in FIG. 8 by the dotted line H going from memory 7 to image analysing means 5. Alternatively, this information is provided directly to image dividing means 6, as shown in FIG. 8. In both of these embodiments there is a feedback loop from the memory to the image dividing means, either directly or via image analysing means 5.

The parameter settings par1 to par5 (any of them or any combinations of them, including all of them, and including embodiments in which only one or only a combination of image parameters (par3, par4, par5) is used for dividing the image into areas) and in some embodiments the additional information from memory 7 are then used in image dividing means 6 to divide the image into image areas and allocate a number frames to each image area to be stored in memory 7. Embodiments in which only one or only a combination of image parameters (par3, par4, par5) is used for dividing the image into areas can for instance be advantageous if information on the sensor parameter or parameters and/or sensor orientation is not available and/or is unreliable The information received from memory 7 may in some embodiments also include information on the available memory space. By monitoring the available memory space the image dividing means 6 may calculate an optimum between, on the one hand, improving image quality by increasing the number of frames stored for certain image areas and, on the other hand, managing available memory space. Alternatively, number of frames can be exchanged for image resolution in which case the number of bits used per pixel or number of pixels used per image can be reduced in order to be able to store more frames. Further, if memory 7 is used in combination with multiple cameras 1, priority in terms of memory usage, image quality, image processing etc. can be given to certain cameras. In FIG. 8 the frame data fr1, fr2 etc. and image data Istore to be stored is then transferred from processing unit 2 to memory 7.

The memory data O from memory 7 can then be accessed by post-processing unit 8. In embodiments of the invention the post-processing unit 8 may also receive information from the image processing unit 2 on the input parameters used (par1, par2 etc.) and/or the image division (image areas and number of frames), in FIG. 8 schematically indicated by the arrow D. Alternatively, this information is added to the memory data O, for instance in the form of metadata. It may for example be advantageous for a post-processing unit 8 to have knowledge on the image division in areas and the number of frames stored per area in order to be able to perform certain image enhancements such as blending, smoothing, etc. In some embodiments the post-processing unit 8 may provide information, in FIG. 8 schematically indicated by signal Q, to the image processing unit 2 for giving feedback on for example some sort of quality performance indicator for the whole process. This feedback loop can enhance the quality of the system and the method according to the invention. The information Q may be regarded as an additional input, next to image I, parameters par1 to par5 and memory information H for image processing unit 2 to create an optimal image division and frame storage plan. As an example of a possible image post-processing activity preformed by post-processing unit 8, reference is made to FIG. 7 (described above) illustrating adaptive movement detection by means of using differential images.

In FIG. 8 the image sensor 1 sends the recorded data directly to the image processing unit 2. The division of the captured image into areas was therefore done after recording of the image by the image sensor 1. Each image was captures completely and thereafter certain parts of the image were retained and stored in the memory. A slightly different, yet equivalent way of implementing the invention is by having only selected areas of the image recorded for a given frame and sent to memory 7. FIG. 9 illustrates a very basic embodiment. The image sensor 1 receives sensor settings 91 to be used by selector 4. These sensor settings 91 determine which area(s) of the image are recorded for given frames and/or for which area(s) the image data are sent to the memory 7. The areas are selected by the selector 4. The so recorded data is directly sent to memory 7. The memory stores the data in a similar way as described above in relation to FIG. 8, with the only difference that the selection of the data is directly done at the image capturing side i.e. he image sensor 1 itself, rather than using an additional image processing unit 2.

FIG. 10 illustrates a further embodiment of the invention, which is in a sense a combination of the embodiments of FIG. 8 and FIG. 9. In this embodiment the image sensor 1 is fed with static settings 91 and dynamic sensor settings 92. The processing unit 2 computes the dynamic sensor settings 92 for the image sensor 1 and provides them to selector 4. This allows for fine tuning of the image sensor settings on basis of the image(s) collected from the image sensor 1. For example, initially the determining factor may be the lens geometry which for example defines that for peripheral areas more frames are stored than for the central area. This is a fixed setting, for which the scheme of FIG. 9 can be used. In more general terms, a basic setup for dividing an image into image areas may comprise selecting a central areas surrounding by 1 or 2 or 3 or in general N circular bands. In an embodiment according to FIG. 10, there may be provided a preset value N for the number of sub-divisions of the image into areas, via input 91 to selector 4, and there may be provided dynamic information, wherein the dynamic information provides the adapted number N, via input 92 to selector 4. In other words, the fixed setting would then for instance be N=4, i.e. the bias setting is N=4, and the processing unit calculates from the image data it receives from the sensor whether this is the best setting and, if not, sets the number N to a higher or lower value.

In summary the invention can be described as follows:
A system comprises the following:
An image sensor with a lens;
A processing unit;
optionally a memory unit;
wherein the image processing unit is adapted to, for selected areas of the image, store a set of frames from the past, where the division of the image in areas and/or the number of frames captured and/or stored for the selected areas depends on lens parameters and/or position/orientation of the image sensor and/or parameters of the image itself.

In the claims, any reference signs placed between parentheses shall not be construed as limiting the claim.

In a further aspect of the invention, a computer program product is provided comprising program code for performing the method according to the present invention. Under computer program product should be understood any physical realization of a collection of commands enabling a processor (generic or special purpose), after a series of loading steps for loading program code into the processor (which may include intermediate conversion steps, like translation to an intermediate language or final processor language) to execute any of the characteristic functions of the invention. In particular, the computer program product may be realized as data on a carrier such as e.g. a disk or tape, data present in a memory, data traveling over a network connection (wired or wireless), or program code on paper. Apart from program code, characteristic data required for the program may also be embodied as a computer program product.

In a still further aspect of the invention, a signal is provided wherein the signal is derived from data stored in a memory wherein the image is divided into areas and for each area the information of a number of frames of image recorded is stored, and wherein the signal comprises information on the division of the image in areas and the number of frames stored for each area.

The word "comprising" does not exclude the presence of other elements or steps than those listed in a claim. Use of the article "a" or "an" preceding an element does not exclude the presence of a plurality of such elements.

The word "means" comprises any means, whether in the form of software, hardware any combination thereof for performing the function indicated.

The various elements of the disclosed systems may be incorporated in a single device or various elements may be incorporated in different devices at different physical positions, for instance when signals are sent from one place to another or to an internet site to be processed or analyzed.

The method of "ascertaining parameters" may comprise at least one of collecting parameters via an input calculating parameters from data collected finding parameters in a look-up table when information on the look-up table is received and any other means to collect, find, calculate or estimate a parameter to be used in a function.

The invention may be implemented by any combination of features of various different preferred embodiments as described above.

The invention claimed is:

1. A vision system comprising:
an image sensor for capturing an image;
at least one of a sensor setting ascertaining means for establishing an image sensor parameter, wherein the sensor setting ascertaining means comprises means for capturing and/or storing and/or calculating a position or an orientation of the image sensor, and an image analysis means for analysing an image taken by the image sensor and establishing an image parameter;
an image dividing means for dividing the image into areas as a function of the established image sensor parameter and/or the established image parameter, and for assigning to each area a number of frames to be stored in a memory,
the image sensor further comprising a wide-angle lens, and wherein dividing the image into areas and assigning to each area a number of frames to be stored in memory is a function of a lens parameter of the wide-angle lens.

2. The vision system as claimed in claim 1, the system further comprising
a memory configured to store a number of frames of an image area in accordance with the assignment of a number of frames to an image area.

3. The vision system as claimed in claim 1,
wherein the sensor setting ascertaining means further comprises means for capturing and/or storing and/or calculating information on a lens parameter of the image sensor and/or a position or an orientation of the image sensor, and
wherein the image analysis means comprises means for capturing and/or storing and/or calculating information on a brightness value in the image and/or a motion detection in the image and/or a motion detected in past image frames.

4. The vision system as claimed in claim 1, wherein the image sensor is positioned and/or oriented to capture a field of view, and wherein dividing the image into areas and assigning to each area a number of frames to be stored in memory is a function of the field of view of the image sensor.

5. The vision system as claimed in claim 2, the system further comprising a memory feedback loop from the memory to the image dividing means, wherein dividing the image into areas and assigning to each area a number of frames to be stored in a memory is further made as a function memory information fed back.

6. The vision system according to claim 5, the system further comprising a post-processing means for processing the number of frames stored in memory for an image area, so as to increase image quality in the image area and/or increase motion detection quality in the image area.

7. Method of processing an image captured from an image sensor, comprising:
capturing an image using an image sensor, wherein the image sensor comprises a wide-angle lens;
establishing at least one of an image sensor parameter, wherein the image sensor parameter comprises information on a position or an orientation of the image sensor, and an image parameter through analysis of the image captured by the image sensor;
dividing the image into areas as a function of the established sensor parameter and/or image parameter;
assigning to each area a number of frames to be stored in a memory, and;
storing the number of frames for each area into memory,
dividing the image into areas and assigning to each area a number of frames to be stored in memory as a function of a lens parameter of the wide-angle lens.

8. The method according to claim 7, wherein the at least one image sensor parameter is one of a lens parameters of the image sensor and a position and/or orientation of the image sensor.

9. The method according to claim 8, wherein the at least one image parameter is one of a brightness value in the image and a motion detection in the image and a motion detected in past image frames.

10. The method according to claim 9, further comprising the step of:
retrieving feedback information from the memory and dividing the image into areas and assigning to each area a number of frames based on the retrieved feedback information from the memory.

11. The method according to claim 10, further comprising the step of:
post-processing the number of frames stored in memory for an image area, so as to increase image quality in the image area and/or increase motion detection quality in the image area.

12. A computer program product stored on a non-transitory computer-readable medium which, when loaded and executed in a computer, executes the method as claimed in claim 7.

13. An image processing data signal for storing an image from a wide-angle lens image sensor into a non-transitory computer-readable memory, the signal comprising information on a division of the image into areas and for each area information on a number of frames to be stored in the memory as a function of a lens parameter of the wide-angle lens.

* * * * *